March 15, 1966 F. A. RODGERS 3,240,683
DISTILLATION APPARATUS USEFUL FOR TREATING SEA
WATER TO PRODUCE POTABLE WATER
Filed May 2, 1962
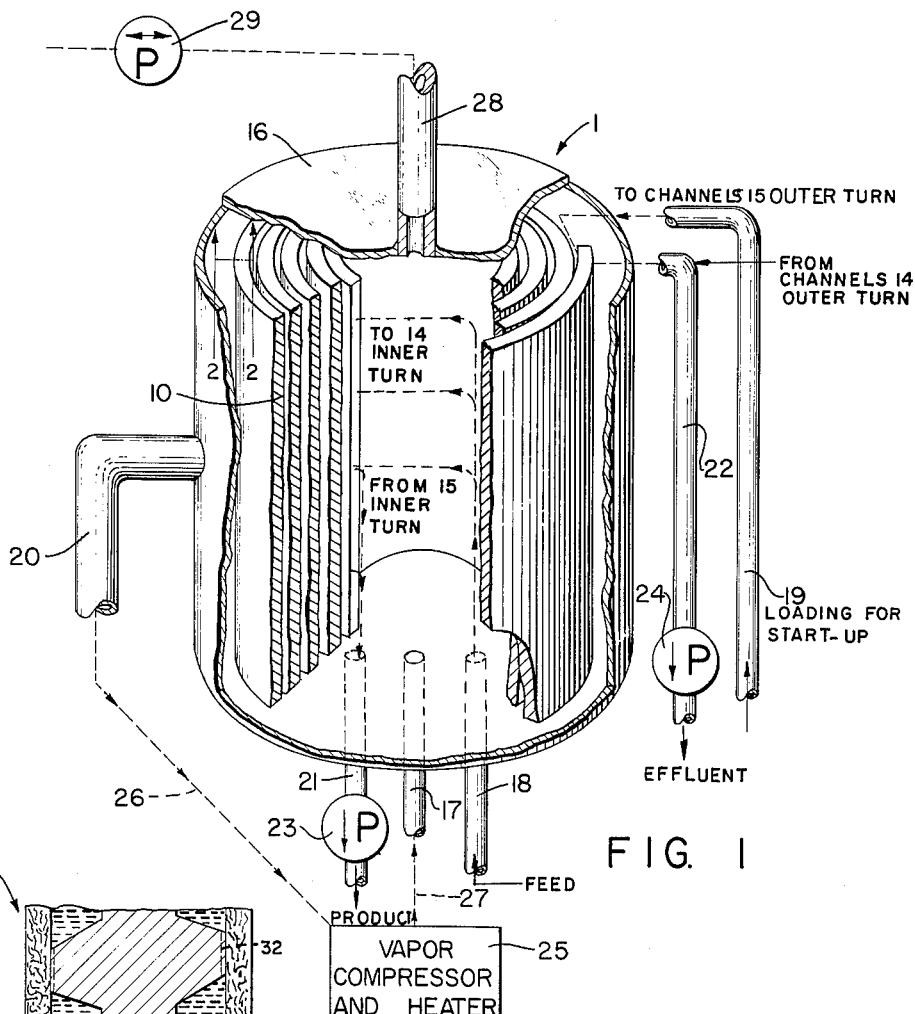
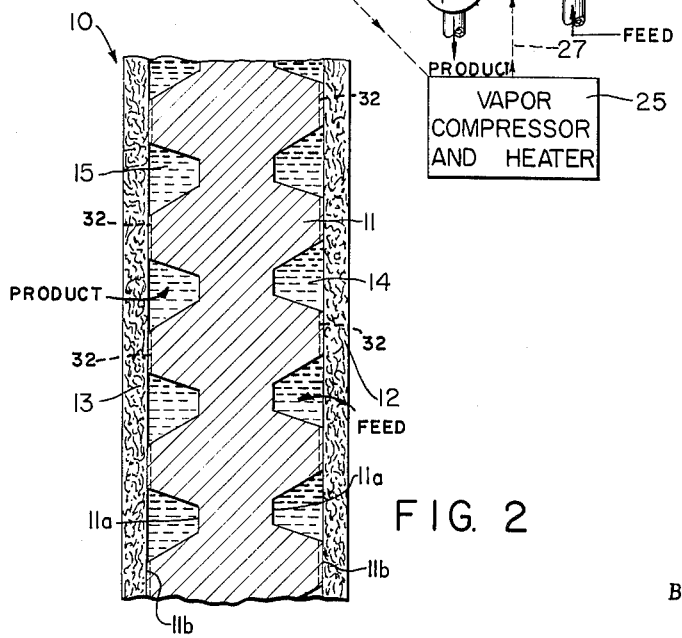
INVENTOR.
Franklin A. Rodgers
BY Brown and Mikulka
ATTORNEYS

United States Patent Office 3,240,683
Patented Mar. 15, 1966

3,240,683
DISTILLATION APPARATUS USEFUL FOR TREATING SEA WATER TO PRODUCE POTABLE WATER
Franklin A. Rodgers, Las Vegas, Nev., assignor to Pactide Corporation, Cambridge, Mass., a corporation of Delaware
Filed May 2, 1962, Ser. No. 191,861
4 Claims. (Cl. 202—173)

This invention relates to novel apparatus for recovery of liquids from solutions or mixtures containing said liquids, and more particularly to novel heat exchange means especially adapted for the recovery, separation and/or purification of liquid bodies.

Various procedures utilizing principles of heat exchange are of course well known in the art. One such procedure employs heat exchange techniques in the recovery, purification and/or separation of a liquid from compositions containing the same, e.g., solutions, emulsions or dispersions. Such systems have been found to be particularly useful in the recovery of potable drinking water from sea water and the like. Apparatus heretofore employed in the art for the recovery of potable drinking water and for analogous processes have suffered from one or more deficiencies and have never been completely satisfactory.

It is therefore the primary object of this invention to provide a novel apparatus useful in the recovery, purification and/or separation of a liquid from solutions or mixtures containing the same.

Another object is to provide a novel apparatus useful in the recovery, purification and/or separation of a liquid by heat exchange techniques.

Yet another object is to provide a novel apparatus useful in the recovery of potable drinking water from unhealthy or unpalatable aqueous solutions, such as sea water and the like, containing an appreciable amount of salt and/or other contaminants.

Other objects of the invention will be in part be obvious and will be in part appear hereinafter.

The invention accordingly comprises the apparatus possessing the construction, combination of elements and arrangement of parts, and which are exemplified in the following detailed disclosure, and the scope of the application of which will be indicated in the claims.

For a fuller understanding of the nature and objects of the invention, reference should be had to the following detailed description taken in connection with the accompanying drawings wherein:

FIGURE 1 is a partly schematic, perspective view of the preferred embodiment of this invention with portions broken away; and FIG. 2 is a vertical section taken along lines 2—2 of FIGURE 1.

As was indicated previously, apparatus for the distillation and recovery of liquids by heat exchange techniques are known in the art. It is also known to employ such apparatus in the recovery of potable drinking water from sea water and the like. One such apparatus commonly employed in the art comprises a vertical tube heat exchanger of suitable dimensions and made of a suitable heat-conductive material, such as steel, copper, etc. In operation, the influent to be treated, e.g., sea water, is admitted at the top thereof say, for example, from a suitable manifold and flows by gravity down the internal wall of the tube in a thin film which may, for example, be on the order of .005 to .010 inch thick, while steam is simultaneously applied against the exterior wall. The steam condenses on the exterior wall and flows down the side thereof where it may be recovered as potable drinking water or recycled for subsequent use, while the heat therefrom is transferred or conducted from the condensing steam through the condensed water, the wall of the tube and the thin film of influent on the interior wall, causing vaporization of a portion of the water from the influent. The vapors therefrom pass upwards out of the tube and may be condensed and recovered as potable drinking water or alternatively employed to treat influent passing down a second tubular device connected in series. In commercial utilization, a plurality of such devices may be employed in this manner to furnish the requisite amount of potable water. The influent which is concentrated by the evaporation is recovered and the concentrated effluent may either be discarded or recycled.

Apparatus of the foregoing nature, as was mentioned earlier, all suffer from one or more deficiencies and have never been completely satisfactory. It will be apparent that in such heat exchange apparatus it is necessary for the heat to be conducted or transferred through the two liquid films as well as through the wall of the tube and the low heat conductivity of such films significantly diminishes the efficiency of the heat transfer. This in turn creates quite a problem as it requires careful control of the system, as well as the use of extremely thin films of condensed steam and influent, in order to provide the amount of the heat necessary to effect distillation of water from the influent.

The present invention obviates the aforementioned problem by providing a novel device wherein the heat necessary to effect distillation need not be conducted through the condensed steam and influent. The invention will be more readily understood by reference to the accompanying drawings.

As shown in FIGURES 1 and 2, a heat exchange apparatus 1 is provided, having a spiral comprising a composite plate-like heat exchange unit 10. Heat exchange unit 10 has a recessed or grooved center plate member 11 made of a suitable heat-conductive material, e.g., nickel-plated copper, and a pair of porous heat-conductive outer members 12 and 13 which may be the same or different. The grooves or recesses in center member 11 form a plurality of channels 14 and 15 which are defined by the inner walls 11a and the inner surfaces of porous outer members 12 and 13, respectively. The channels 14 are separated from channels 15 by center member 11. Members 12 and 13 are in intimate contact with the outer walls 11b of center plate member 11. The porous outer members 12 and 13 preferably are a pair of heat-conductive "metallic sponges" comprising a matrix of a heat-conductive metallic substance with interstices of sufficient porosity to permit ingress and egress of liquid and/or vapor to and from the plurality of channels 14 and 15. The matrix may comprise either uniformly or randomly distributed heat-conductive metallic particles, strips, fibers, etc., depending upon the geometric structure of the porous interstices desired. "Metallic sponges" of the foregoing description made of heat-conductive materials, such as titanium, are well known to those skilled in the art and, per se, comprise no part of the present invention. Although "metallic sponges" are preferred, outer members 12 and 13 may obviously be other porous heat-conductive structures. For example, the porous members may be metallic plates, screens, etc., having porous openings corresponding to or aligned with channels 14 or 15, the metallic heat-conductive portions of the members being in intimate contact with outer walls 11b. Channels 14 are preferably but not necesarily interconnected by means of suitable passages which may, for example, be provided by peripheral grooves or recessed areas 32 (shown by dotted lines) in outer walls 11b for reasons which will be pointed out with more particularity hereinafter. In like manner, channels 15 are preferably but not necessarily interconnected by peripheral grooves 32.

It will be appreciated that heat exchange unit 10 is relatively thin in order to effect the necessary heat exchange, although the dimensions may vary to some extent. Particularly good results may be obtained from a unit wherein the distance between the outer walls 11b is on the order of .050 inch; and the distance between the inner walls 11a is on the order of .030 inch; to provide channels on either side of the center plate which are on the order of .010 inch thick. The amount of grooves or recesses in center plate member 11 may also vary, as will be understood by those skilled in the art. For purposes of illustration, center plate member 11 may, for example, have 50 such grooves/linear inch on ether side of the center plate.

The essence of the invention is the provision of a novel heat exchange unit, such as illustrated in FIG. 2, it being expressly understood that the grooved center plate may be of geometric configurations other than that shown for purposes of illustration. For example, the center plate member may be ribbed or wavy or of a "snake-like" configuration to provide the necessary channels and areas in intimate contact with the outer porous members. Other geometric configurations will be apparent to those skilled in the art.

In order to make the invention more clearly understood, the invention will now be described with reference to its simplest embodiment utilizing the novel heat exchange unit illustrated in FIG. 2 to recover potable drinking water from sea water.

The process is preferably performed in an enclosed environment maintained under a reduced or partial pressure. Channels 14 are filled with the sea water to be treated. The sea water may be admitted at the top to flow down through the peripheral grooves in outer wall 11b or may be pumped upward to fill channels 14 in the same manner, but preferably it enters the unit through a manifold which causes the main flow of liquid to be in a direction perpendicular to the plane of the section of FIG. 2. Due to the negative pressure in which the process is carried out, the sea water in channels 14 passes into and fills the interstices of metal sponge 12.

After channels 14 are filled with sea water, steam from a suitable source is applied laterally against substantially the entire length of porous member 13. The steam and/or water formed by the steam condensing at or in porous member 13 passes therethrough where it collects in channels 15 as potable water. The water so collecting may be recovered either at the bottom or at the top or at the ends of unit 10 by suitable pumping means, while the heat therefrom passes or is conducted through center plate member 11 and from the outer wall thereof 11b to porous member 12. The heat transferred to the heat-conductive matrix of the metal sponge causes vaporization of a portion of the water from the sea water contained in the interstices. The water vapor or steam passing from the metal sponge may be recovered as potable drinking water or it may be employed as the source of heat to treat a second unit connected in series or in parallel and also loaded with sea water. It will therefore be appreciated that one or a plurality of heat exchange unit 10 may be so arranged that a single initial source of steam may be employed to generate a given amount of potable drinking water. The concentrated sea water, a portion of its water content being recovered, may then be removed from the unit or units and the process repeated.

It has been found that in distillation procedures, such as described above, the sea water in metal sponge 12 may tend to get too concentrated, thereby slowing down or completely precluding the output of water vapor, thus interfering with the efficiency of the system. Moreover, "scaling" or the depositing of salt may occur, thereby clogging up the porous interstices. It has been found that this problem may be obviated in a simple and efficient manner by connecting a pulsating vacuum pump to channels 14. The pulsating or alternate sucking action of the pump causes a purging action whereby the more concentrated sea water in metal sponge 12 is sucked back into channels 14, after which the sponge is immediately replenished with a more dilute solution.

From the foregoing description, it will be appreciated that channels 14 act as a well or a reservoir for the sea water, the recovery of potable drinking water being by the heating and subsequent vaporization of the sea water contained in the interstices of the porous member 12. The heat necessary to effect this result need not be appreciably conducted through the two fluids employed in the system, as in the prior devices previously mentioned, the transfer or exchange of heat instead being performed by the heat-conductive matrices of members 12 and 13 which are interconnected through outer walls 11b of center plate member 11. Not only is the necessity for utilizing thin films of influent and condensed steam obviated, but the heat exchange is performed by better and consequently more efficient heat conducters than the fluids essential in the operation of prior systems, thereby inturn providing a more efficient system which also may be operated at lower temperatures.

As was indicated earlier, the foregoing description refers to the simplest embodiment utilizing the novel heat exchange unit of this invention. In the preferred embodiment, use is made of the system illustrated in FIGURE 1.

As shown in FIGURE 1, the heat exchange unit 10 is arranged as a spiral to provide, in essence, a plurality of units with porous members 12 of the innermost turn of the spiral being separated by a thin gap from and aligned with porous member 13 of the next outermost turn and so on throughout the spiral. The amount of turns in the spiral may be of any desired number, as limited only by the temperature sought between the various turns, which in turn is determined at least in part by the concentration of the brine. Preferably, the spiral will have from 1–100 turns. The gap between each turn may likewise vary to some extent, say from 1 mm. to 100 mm. as determined by the efficacy of removal of absorbed gases such as air from the chamber. In general, small gaps of the order of 1 to 10 mm. are preferred. In a typical embodiment, a heat exchange unit approximately one foot wide and 20 ft. long may be formed lengthwise into a spiral having approximately twenty turns and a gap of approximately .005 to .010 in. between each turn or spiral. The innermost end of the spiral preferably abuts the next outermost turn of the spiral to define an inner compartment or chamber.

The heat exchange unit is confined within a suitable outer container 16 provided with appropriate openings at the bottom thereof to permit entry of steam inlet conduit 17 and influent conduit 18. A fresh water inlet conduit 19 is provided near the top to permit a flow of fresh water into the apparatus in a direction opposite to the flow of influent. Conduits 17 and 18 empty into the innermost chamber or compartment of the spiral, where influent conduit 18 is connected to channels 14 at the beginning of heat exchange unit 10 by suitable connecting means (not shown). While fresh water conduit 19 is shown to be connected to channels 15 at the outer end of the spiral, it will be appreciated that conduit 19 may be connected at the beginning of the unit in lieu thereof. A steam outlet conduit 20 is provided on the side of outer container 16 to permit egress and recycling of steam formed exterior to the outermost turn of the spiral, as will be described in more detail hereinafter. Potable water outlet conduit 21 and effluent outlet conduit 22 are connected to channels 15 and 14 respectively by suitable connecting means (not shown). As shown in the drawings, conduit 21 is connected at the inner end and conduit 22 is connected at the outer end of the spiral. Conduits 21 and 22 are provided with pumping means 23 and 24, respectively. Steam outlet conduit 20 is connected to a vapor compressor and heating means 25 by a suitable conduit 26. Means 25 in turn is connected to steam inlet conduit 17 by a suitable conduit 27 to permit recycling of steam leaving the system through outlet 20. A conduit 28 having associated therewith pumping means 29 is preferably provided at the top of container 16 to permit removal of air and/or other gases which may be initially present or which may subsequently accumulate in the innermost compartment and/or the gaps separating the several inner turns of the spiral. Where desired, in certain operations which may be performed by the novel apparatus of this invention, conduit 28 may be employed to create a positive pressure in the innermost compartment and in the gaps between the several turns of the spiral.

In operation, a partial vacuum is impressed by activating pumps 23, 24 and/or 29. While it is conceivable that the system may be operated without a partial vacuum, an atmosphere of reduced pressure is preferred in order to effect vaporization of the influent at temperatures below ambient temperature. Excellent results may be obtained, for example, by providing an absolute pressure of 2 in. of mercury before initiating operation.

After the partial vacuum is impressed, the system is then loaded by supplying sea water through conduit 18 and fresh water through conduit 19 to fill channels 14 and 15, respectively. The sea water or influent is preferably introduced at room temperature and the fresh water is preferably introduced at lower temperatures, say for example, at approximately 40° F. Due to the reduced pressure, the water in the influent vaporizes. The vapor or steam evolving from the outermost turn of the spiral is withdrawn through outlet 20 and is heated and recycled back into the innermost compartment of the spiral through conduit 17 where it condenses and enters channels 15 at the beginning of the spiral. As was previously explained, the heat therefrom is transferred through center plate member 11 to porous member 12 containing sea water in its interstices. The vapor or steam formed by this heat transfer then condenses and collects in channel 15 of the next outermost portion of the spiral and the process is repeated throughout the entire heat exchange unit. In a continuous operation, influent is continuously introduced through conduit 18 at a rate sufficient to keep the channels 14 replenished, while concentrated effluent and potable drinking water are continuously withdrawn through conduits 22 and 21, respectively. It will therefore be seen that the introduction of fresh water via conduit 19 is necessary only at the beginning of the operation to prime or load the apparatus, after which potable drinking water is continuously withdrawn. In a device of the foregoing description, once a steady rate of operation is attained, potable drinking water may be withdrawn at the rate of 10 gal. per hour or more.

As was indicated previously, most preferably, porous member 12 is alternately purged by pulsating or intermittently applying a sucking action through pumping means 24 in order to prevent the influent in porous member 12 from becoming too concentrated during the operation.

The concentrated effluent withdrawn via conduit 22 may be discarded or recycled, as desired, and the drinking water withdrawn via conduit 21 may be recovered in suitable collecting means (not shown). The particular arrangement of piping and valve means which may be employed to accomplish these results will be obvious to those skilled in the art and are not shown in the drawings.

As was indicated above, in the preferred embodiment, the influent is introduced at ambient temperatures and the fresh water is introduced at reduced temperatures. In desalination procedures, the introduction of influent at ambient temperatures or higher is preferred to prevent "scaling." However, it is to be expressly understood that both the influent and the fresh water may be introduced at any desired temperatures above, below or at ambient temperatures. While the influent and fresh water are preferably circulated in opposite directions in order to obtain the advantages of efficiency of operation resulting from the heat exchange occurring between the liquids, it will also be appreciated that, if desired, the two solutions may be introduced in the same direction without departing from the scope of the invention.

It will thus be seen that the preferred embodiment of the invention offers a simple and efficient means for recovering potable drinking water from sea water and the like. A single source of steam entering at the innermost portion of the spiral sets in operation, in chain fashion, the necessary heat exchange throughout the entire heat exchange unit. A most significant advantage of the preferred embodiment is that the construction and arrangement of elements provides a substantially uniform temperature gradient throughout the system.

It is to be expressly understood that the foregoing description and specific example of the invention is by way of illustration only. Various changes and/or substitutions of equivalent means in the construction of the novel apparatus of this invention will be readily suggested to those skilled in the art and are therefore within the scope of the invention. For example, a plurality of the apparatus shown in FIGURE 1 may be connected in series or in parallel to increase the output of potable drinking water. It should be likewise apparent that the novel apparatus of this invention may be employed in processes other than the recovery of potable drinking water. Obviously, the apparatus is adaptable for other distillation procedures involving the removal, purification and/or recovery of liquids from other liquid compositions. For example, it is contemplated that the novel apparatus of this invention may find application in the fractional distillation or separation of petroleum fractions of varying boiling points. It is likewise contemplated that the novel heat exchange unit may be employed in cooling or refrigerating processess wherein a liquid body is chilled or frozen by the transfer of heat therefrom. In some operations, it is contemplated that it may be desirable to increase the pressure within the chamber by introducing a suitable gas through conduit 28, in order to facilitate the reduction of pressure in the channels or to prevent bubbling or boiling during the purging of porous member 12.

Since certain changes may be made in the above apparatus without departing from the scope of the invention here involved, it is intended that all matter contained in the above description or shown in the accompanying drawings shall be interpreted as illustrative and not in a limiting sense.

What is claimed is:
1. Distillation apparatus comprising, in combination:
  a heat exchange assembly including an intermediate, sheet-like, fluid impermeable element having recessess in opposite sides thereof formed of a material having relatively good thermal conductivity and a pair of outer, sheet-like, porous elements formed of a material having relatively good thermal conductivity arranged in intimate face-to-face contact with opposite sides of said fluid impermeable element;
  said recesses in said fluid impermeable element cooperating with the facing surfaces of said porous elements to define a plurality of channels for containing and circulating fluids;
  said heat exchange assembly being arranged in the form of a spiral having an innermost and an outermost turn with one of said porous elements of each turn of said spiral disposed in spaced face-to-face relation with the other of said porous elements of the next adjacent turn of said spiral;

means for supplying the heated vapor of a liquid to said one of said porous elements;

means for removing said liquid resulting from condensation of said vapor from said channels between said one porous element and said impermeable element at said innermost turn;

means for introducing a solution including said liquid and a less volatile constituent into said channels between said impermeable element and said other of said porous elements for permeation into said other porous element;

means for collecting the vapor of said liquid resulting from evaporation of said solution in said other porous element;

means for introducing said solution into said channels at the innermost turn of said spiral and causing said solution to flow outwardly in said channels through successive turns of said spiral; and means for introducing said heated vapor into one porous element at said innermost turn.

2. Distillation apparatus as defined in claim 1 including outer enclosure means surrounding said heat exchange assembly.

3. Distillation apparatus as defined in claim 1 including:

outer enclosure means surrounding said heat exchange assembly;

means for removing the vapor of said liquid evolving from said outermost turn;

means for removing said solution more concentrated by said less volatile constituent from said enclosure means; and means for causing said liquid to flow inwardly in said channels through successive turns of said spiral and removing said liquid from said channels at said innermost turn.

4. Distillation apparatus as defined in claim 3 wherein said means for introducing said solution include means for effecting substantial variations in the hydrostatic pressure of said solution in said channels between said impermeable element and said other porous element.

References Cited by the Examiner
UNITED STATES PATENTS

| | | | |
|---|---|---|---|
| 2,131,265 | 9/1938 | Bichowsky | 165—165 |
| 2,277,921 | 3/1942 | McCullough et al. | 165—165 X |
| 2,445,350 | 7/1948 | Ginnings. | |
| 3,004,590 | 10/1961 | Rosenblad | 202—174 X |
| 3,018,087 | 1/1962 | Steele | 165—105 |
| 3,129,145 | 4/1964 | Hassler | 202—174 X |

ROBERT F. BURNETT, *Primary Examiner.*

NORMAN YUDKOFF, *Examiner.*